United States Patent
Kamen et al.

(10) Patent No.: US 8,457,373 B2
(45) Date of Patent: Jun. 4, 2013

(54) SYSTEM AND METHOD FOR ROBUST 2D-3D IMAGE REGISTRATION

(75) Inventors: Ali Kamen, Princeton, NJ (US); Hari Sundar, Piscataway, NJ (US); Wolfgang Wein, Munich (DE)

(73) Assignee: Siemens Aktiengesellschaft, Munich (DE)

(*) Notice: Subject to any disclaimer, the term of this patent is extended or adjusted under 35 U.S.C. 154(b) by 410 days.

(21) Appl. No.: 12/717,392

(22) Filed: Mar. 4, 2010

(65) Prior Publication Data
US 2011/0122226 A1 May 26, 2011

Related U.S. Application Data

(60) Provisional application No. 61/160,373, filed on Mar. 16, 2009.

(51) Int. Cl.
*G06K 9/00* (2006.01)
(52) U.S. Cl.
USPC .................................................. 382/128
(58) Field of Classification Search
None
See application file for complete search history.

(56) References Cited

U.S. PATENT DOCUMENTS

| 5,568,384 A * | 10/1996 | Robb et al. ............... 715/202 |
| 2004/0049309 A1 * | 3/2004 | Gardner et al. ............ 700/132 |

OTHER PUBLICATIONS

Dorin Comaniciu, et al., "Mean Shift: A Robust Approach Toward Feature Space Analysis," IEEE Transactions on Pattern Analysis and Machine Intelligence, vol. 24, No. 5, May 2002.

* cited by examiner

*Primary Examiner* — Sath V Perungavoor
*Assistant Examiner* — Dakshesh Parikh
(74) *Attorney, Agent, or Firm* — Donald B. Paschburg; F. Chau & Associates, LLC (57) ABSTRACT

A method for registering 2-dimensional (2D) images with 3-dimensional (3D) images includes receiving a 2D reference image and a 3D moving image, initializing a registration parameter matrix that rigidly transforms the domain of the moving image, randomly sampling a set of registration parameter matrices in a neighborhood of the initial registration parameters, estimating a cost function for each of the randomly sampled parameter matrices, calculating a distance from each randomly sampled parameter matrix to the initial registration parameter matrix, calculating a mean shift vector from the estimated cost functions and distance, and updating the initial registration parameter matrix from the mean shift vector.

23 Claims, 6 Drawing Sheets

| Case | small range conv. FRE(mm) | success% | small range inv. FRE | success | large range conv. FRE | success | large range inv. FRE | success |
|---|---|---|---|---|---|---|---|---|
| Neuro | 3.56+/-1.2 | 100 | 4.09+/-0.7 | 100 | 3.89+/-2.8 | 41 | 4.12+/-0.8 | 95 |
| Abdom. | 6.23+/-1.5 | 100 | 6.87+/-1.4 | 100 | 6.74+/-1.9 | 55 | 7.01+/-1.3 | 89 |

Table 1.

| Case | small range conv. TRE(mm) | success% | small range inv. TRE | success | large range conv. TRE | success | large range inv. TRE | success |
|---|---|---|---|---|---|---|---|---|
| Pos. Ver | 1.5+/-0.8 | 100 | 1.03+/-0.6 | 100 | 1.9+/-0.8 | 61 | 1.2+/-0.7 | 97 |

Table 2.

SYSTEM AND METHOD FOR ROBUST 2D-3D IMAGE REGISTRATION

CROSS REFERENCE TO RELATED UNITED STATES APPLICATIONS

This application claims priority from "Robust Image Registration Using Clustering Techniques on the Manifold of the Registration Parameters", U.S. Provisional Application No. 61/160,373 of Khamene, et al., filed Mar. 16, 2009, the contents of which are herein incorporated by reference in their entirety.

TECHNICAL FIELD

This disclosure is directed to methods of registering 2D images with 3D images.

DISCUSSION OF THE RELATED ART 2D-3D image registration is considered an enabling technology for many image guided treatment scenarios. There have been a number of approaches proposed in the literature for various clinical applications. Almost all have focused on devising a specific image (dis)similarity metric to arrive at a better solution for the clinical application at hand. In most of the approaches only "off-the-shelf" optimization techniques are utilized. Robust 2D-3D registration requires a well-behaved similarity metric and a good optimization algorithm, and should be able to deal with local non-convexities. Capture range is one of main criterion for robustness when it comes to image registration.

In general, image registration methods can be categorized in two distinct groups: features based and intensity-based techniques. Feature-based methods primarily rely on a pre-processing, often a pre-segmentation, step, where local structures of particular interest such as points are determined. Once such structures have been identified in both images, the registration parameters are computed to align them. The strength of these methods is relatively low computation complexity once the features have been extracted. On the other hand, their performance depends on feature extraction, which can be viewed as an important limitation.

In the other class, intensity based methods, a part or an entire image is used for registration. In this case, an image projection operator is needed to generate 2D Digitally Reconstructed Radiographs (DRR) from the 3D intensity data. An image match criterion or image (dis)similarity metric, such as linear correlation or correlation ratio are usually used within an optimization loop, which requires computation of DRRs at each step. Mutual information and local normalized correlation are two widely used similarity metrics. Gradient descent, best neighbor, and Powell-Brent optimization methods are among the most common approaches to recover the registration parameters once the task has been expressed with an energy formulation. Nevertheless, it is understood that these methods are subject to local minima and have a limited capture range.

To address this limitation, one technique starts from low-order estimates—valid in a limited region—and performs a progressive refinement as the associated region expands. In another attempt, a sequential Monte-Carlo scheme was used to explore a number of hypothesized poses and resample as the process progresses toward a better solution. Both of these methods suffer from an excessive number of cost function calls, and are prohibitively slow for an intensity based approach.

SUMMARY OF THE INVENTION

Exemplary embodiments of the invention as described herein generally include methods and systems for optimizing transformation parameters for 2D-3D registration that can iteratively estimate the local characteristics of the cost function and provide the updates toward the optimum point. The registration task is reformulated as a random exploration of the search manifold. A method according to an embodiment of the invention utilizes a robust classification scheme, such as mean shift algorithm within this to search to arrive at a locally optimal solution. Experiments performed on three clinical scenarios demonstrate that a method according to an embodiment of the invention can outperform a conventional approach in terms of increased capture range and providing a more robust solution.

According to an aspect of the invention, there is provided a method for registering 2-dimensional (2D) images with 3-dimensional (3D) images, the method including receiving a 2D reference image and a 3D moving image, initializing a registration parameter matrix that rigidly transforms the domain of the moving image, randomly sampling a set of registration parameter matrices in a neighborhood of the initial registration parameters, estimating a cost function for each of the randomly sampled parameter matrices, calculating a distance from each randomly sampled parameter matrix to the initial registration parameter matrix, calculating a mean shift vector from the estimated cost functions and distance, and updating the initial registration parameter matrix from the mean shift vector.

According to a further aspect of the invention, the method includes repeating the steps of randomly sampling a set of parameters, estimating a cost function, calculating a distance, and calculating a mean shift vector until a magnitude of the mean shift vector is less than a predetermined constant.

According to a further aspect of the invention, a cost function for a randomly sampled parameter matrix is determined by applying a randomly sampled parameter matrix to transform the domain of the moving image, and calculating one of a similarity metric or a dissimilarity metric on a 2D projection of the transformed moving image and the reference image.

According to a further aspect of the invention, calculating a distance from each randomly sampled parameter matrix to the initial registration parameter matrix comprises calculating $d^2(T_i, T_i^j) = \|\log(T_i^{-1} T_i^j)\|_M^2$, in which $T_i$ is the initial registration parameter matrix, $T_i^j$ is a randomly sampled parameter matrix, and $\|\cdot\|_M$ denotes a matrix norm.

According to a further aspect of the invention, the registration parameter matrix is a 4×4 matrix representing a 3D affine transformation that includes rotation and translation.

According to a further aspect of the invention, the mean shift vector is calculated from $$\Delta_h(T_i) = \frac{-\sum_{j=0}^{m-1} \nabla d^2(T_i, T_i^j) C(T_i^j) g\left(\frac{d^2(T_i, T_i^j)}{h^2}\right)}{\sum_{j=0}^{m-1} C(T_i^j) g\left(\frac{d^2(T_i, T_i^j)}{h^2}\right)},$$

in which $T_i$ is the initial registration parameter matrix, $T_i^j$ is a randomly sampled parameter matrix, $C(T_i^j)$ is the cost function of $T_i^j$, $d^2(T_i, T_i^j)$ is the distance between $T_i$ and $T_i^j$, g is the derivative of a kernel function k of bandwidth h, and the sum is over all randomly sampled registration parameter matrices.

According to a further aspect of the invention, the initial registration parameter matrix is updated from the mean shift vector according to $T_{i+1} = \exp_{Ti}(\Delta_h(T_i))$.

According to a further aspect of the invention, the kernel function k is a bounded function that satisfies $\int k(\|x\|^2)dx=1$, $\int \|x\|k(\|x\|^2)dx=0$, $\lim_{\|x\|\to\infty}\|x\|k(\|x\|^2)=0$, and $\int \|x\|^2 k(\|x\|^2)dx=c_k$, where $c_k$ is a constant and the integrals are over all space.

According to a further aspect of the invention, the kernel function is a Gaussian.

According to a further aspect of the invention, the bandwidth h of the kernel is determined from a standard deviation of a random distribution used to generate the randomly sampled set of registration parameter matrices.

According to a further aspect of the invention, the method includes changing a standard deviation of a random distribution used to generate the randomly sampled set of registration parameter matrices.

According to another aspect of the invention, there is provided a method for registering 2-dimensional (2D) images with 3-dimensional (3D) images, the method including receiving a 2D reference image and a 3D moving image, initializing a registration parameter matrix that rigidly transforms the domain of the moving image, randomly sampling a set of registration parameter matrices in a neighborhood of the initial registration parameters, calculating a mean shift vector from $$\Delta_h(T_i) = \frac{-\sum_{j=0}^{m-1} \nabla d^2(T_i, T_i^j) C(T_i^j) g\left(\frac{d^2(T_i, T_i^j)}{h^2}\right)}{\sum_{j=0}^{m-1} C(T_i^j) g\left(\frac{d^2(T_i, T_i^j)}{h^2}\right)},$$

in which $T_i$ is the initial registration parameter matrix, $T_i^j$ is a randomly sampled parameter matrix, $C(T_i^j)$ is a cost function of $T_i^j$, $d^2(T_i, T_i^j)$ is a distance between $T_i$ and $T_i^j$, g is the derivative of a Gaussian kernel function k of bandwidth h, and the sum is over all randomly sampled registration parameter matrices, and calculating an updated registration parameter matrix $T_{i+1}$ from $T_{i+1} = \exp_{Ti}(\Delta_h(T_i))$.

According to a further aspect of the invention, $d^2(T_i, T_i^j) = \|\log(T_i^{-1} T_i^j)\|_M^2$, in which $\|\cdot\|_M$ denotes a matrix norm.

According to a further aspect of the invention, the cost function $C(T_i^j)$ is determined by applying $T_i^j$ to transform the domain of the moving image, and calculating one of a similarity metric or a dissimilarity metric on a 2D projection of the transformed moving image and the reference image.

According to another aspect of the invention, there is provided a program storage device readable by a computer, tangibly embodying a program of instructions executable by the computer to perform the method steps for registering 2-dimensional (2D) images with 3-dimensional (3D) images.

DETAILED DESCRIPTION OF EXEMPLARY EMBODIMENTS

Exemplary embodiments of the invention as described herein generally include to systems and methods for registering 2D images with 3D images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Methods

A 2D-3D image registration energy functional can be written as follows:

$$\tilde{T} = \operatorname*{argmax}_T \sum_k S(P^k(I_m(T(x))), I_f^k), \quad k \in [0, n-1], \tag{1}$$

where $\tilde{T}$ is the sought after transformation, $I_m$ is the moving (template) 3D image, and $I_f^k$ is one of n 2D fixed (reference) projection images. The projection operator P is used to bring the two images into the same dimension, and finally S is the (dis)similarity metric that needs to either minimized or maximized. The optimization in EQ. (1) can be solved using various methods.

Figure 1:
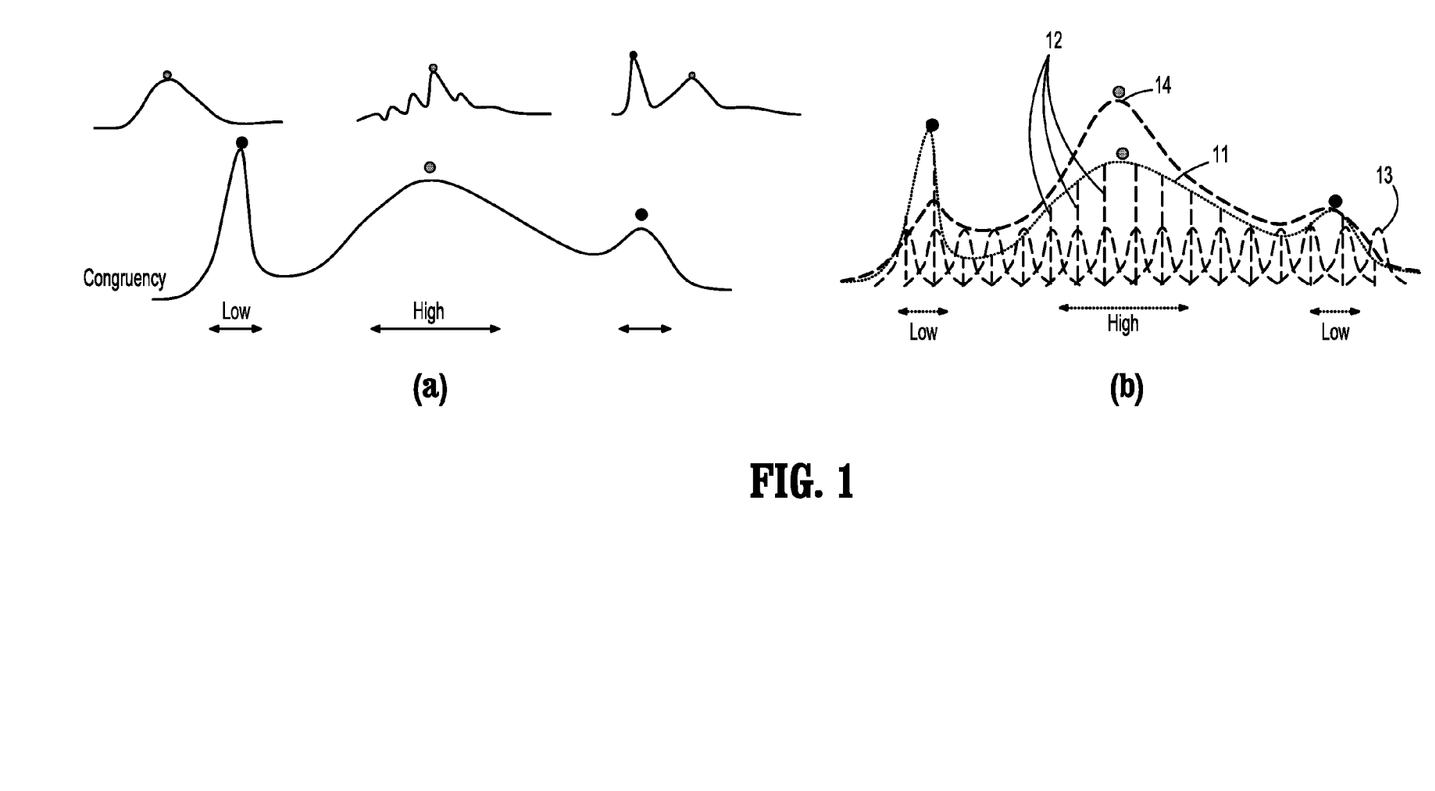
FIGS. 1(a)-(b) depicts examples of cost functions, according to an embodiment of the invention.

A registration approach can be characterized based on the results it produces on a set of data as compared with ground truth. One can, for example, use either target registration error (TRE) or fiducial registration error (FRE) to characterize a certain approach with a specific set of parameters. TRE is determined by looking at pairs of corresponding points not used in calculating the registration transformation, but are within the region of interest (ROI), and is calculated by summing $|y_i(t)-x_i(h(t))|$ where $h(t)$ is the warping function of the image domain point $t$. FRE is similarly determined, but with points not in the ROI used in calculating the registration transformation. The FRE tends to be lower than the TRE. Possible sources of variation within a registration algorithm are: (1) input data; (2) algorithm specific parameter settings; and (3) initial registration. A registration algorithm may be considered "robust", if its characteristics, such as the TRE or FRE, are relatively unaffected by changes in any of the three categories mentioned above. By this definition, it would be challenging to devise an overall "robust" registration algorithm. According to an embodiment of the invention, robustness is considered with respect to the third variable, that is, the initial registration. In order to achieve this, one could either devise a fully convex (dis)similarity metric (cost function), or focus on devising a better optimization scheme. An embodiment of the invention focuses on the latter, and assumes that most of the cost functions are potentially non-convex. Non-convex cost functions with false global optima are quite common in registration. In these cases, even the global maximum is not necessarily an optimum. The top row of FIG. 1(a) depicts various types of cost function. From left to right are shown, a fully convex cost function with one true global extremum, a non-convex function with one true global extremum, and a non-convex function one true local extremum and a global extremum. An embodiment of the invention borrows the notion of cost function congruency from the optimization literature, and hypothesizes that a false global extremum can be considered as an outlier. By definition, there is less cost function value congruency in the neighborhood of an outlier. These extrema are considered to be "bad" optima, since the cost function value drops quickly due to relatively small changes in parameters. The bottom row of FIG. 1(a) depicts on the left and right, cost functions with low congruency, and in the center, a cost function with high congruency. In the light of this hypothesis, an embodiment of the invention looks for "congruent" local maxima to minima in the cost function, that is, wide maxima that drop off slowly as opposed to narrow maxima, rather than global ones.

According to an embodiment of the invention, a rigid transformation may be used where T belongs to the 3D affine group SE(3) and can be represented by a 4×4 homogeneous matrix $$T = \begin{bmatrix} R & t \\ 0 & 1 \end{bmatrix},$$

where R is a rotation matrix and t is a translation vector. Even in this case, with limited number of parameters, it may be impractical to have a dense sampling of the cost functional over a wide range of parameters in order to better understand its characteristics. Nevertheless, one may estimate the cost function within the region spanned by a few samples from the parameter space and perform a kernel-based interpolation.

An embodiment of the invention may start with m samples, denoted $T_i^j$ for $j \in [0, m-1]$), randomly selected within the neighborhood of an initial transformation parameter $T_i$. A non-parametric local estimate of the cost function may be calculated as follows:

$$\hat{C}_k(T) = \frac{c_{k,h}}{m} \sum_{j=0}^{m-1} C(T_i^j) k\left(\frac{d^2(T, T_i^j)}{h^2}\right), \quad (2)$$

where $C(T_i^j)$ is the value associated with sample $T_i^j$, k denotes a kernel function with bandwidth h. According to an embodiment of the invention, the value associated with sample $T_i^j$ would be determined by applying $T_i^j$ to the domain of the moving image, and applying the (dis)similarity metric of EQ. (1) on the 2D projection of the transformed moving image and the reference image. According to an embodiment of the invention, the kernel k is a bounded function that satisfies $\int k(\|x\|^2)dx=1$, $\int \|x\| k(\|x\|^2)dx=0$, $\lim_{\|x\|\to\infty}\|x\|k(\|x\|^2)=0$, and $\int \|x\|^2 k(\|x\|^2)dx=c_k$, where $c_k$ is a constant and the integrals are over all space. An exemplary, non-limiting kernel function would take the form of a Gaussian. $c_{k,h}$ is a normalization factor, in case the cost function is considered as a probability density function. Finally, $d^2(T, T_i^j)$ is a norm defined on the SE(3) manifold and can be computed as follows:

$$d^2(T,T_i^j)=\|\log(T^{-1}T_i^j)\|_M^2, \quad (3)$$

where the $\|\cdot\|_M$ denotes a matrix norm. FIG. 1(b) depicts an original cost function 11, an estimated cost function based on the samples 12, and the specified kernel 13. As is apparent from EQ. (2), there is a possibility of estimating the cost function at different scales by means of adjusting the spacing of the samples as well as the kernel bandwidth h. Furthermore, there is also the chance to detect the cost function congruency and by re-normalization turn a "good" local maximum to a global optimum, as indicated by 14 in FIG. 1(b).

An embodiment of the invention uses a mean shift formulation to compute the displacement toward the global optimum of the current estimate of the cost function. Mean shift is an algorithm for a non-parametric density estimation and clustering from a set of data points. Given a n data points $x_1$, $i=1, \ldots, n$, in a d dimensional space $R^d$, a multivariate kernel density estimator for a radially symmetric kernel k(x) of bandwidth h is $$\hat{f}_{h,k}(x) = \frac{c_{k,d}}{nh^d} \sum_{i=1}^{n} k\left(\left\|\frac{x - x_i}{h}\right\|^2\right),$$

where $c_{k,d}$ is a normalization factor. A first step in the analysis of a feature space with the underlying density f(x) is to find the modes of this density. The modes are located among the zeros of the gradient $\nabla f(x)=0$, and the mean shift procedure can locate these zeros without actually estimating the density f(x). The density gradient estimator is $$\hat{\nabla} f_{h,k}(x) = \frac{2c_{k,d}}{nh^{d+2}} \sum_{i=1}^{n} (x_i - x) g\left(\left\|\frac{x - x_i}{h}\right\|^2\right)$$

$$= \frac{2c_{k,d}}{nh^{d+2}} \left[\sum_{i=1}^{n} g\left(\left\|\frac{x - x_i}{h}\right\|^2\right)\right] \left[\frac{\sum_{i=1}^{n} x_i g\left(\left\|\frac{x - x_i}{h}\right\|^2\right)}{\sum_{i=1}^{n} g\left(\left\|\frac{x - x_i}{h}\right\|^2\right)} - x\right]$$

where $g(x)=-k'(x)$. The second factor in the above expression is the mean shift:

$$m_{h,G}(x) = \frac{\sum_{i=1}^{n} x_i g\left(\left\|\frac{x - x_i}{h}\right\|^2\right)}{\sum_{i=1}^{n} g\left(\left\|\frac{x - x_i}{h}\right\|^2\right)} - x.$$

Figure 6:
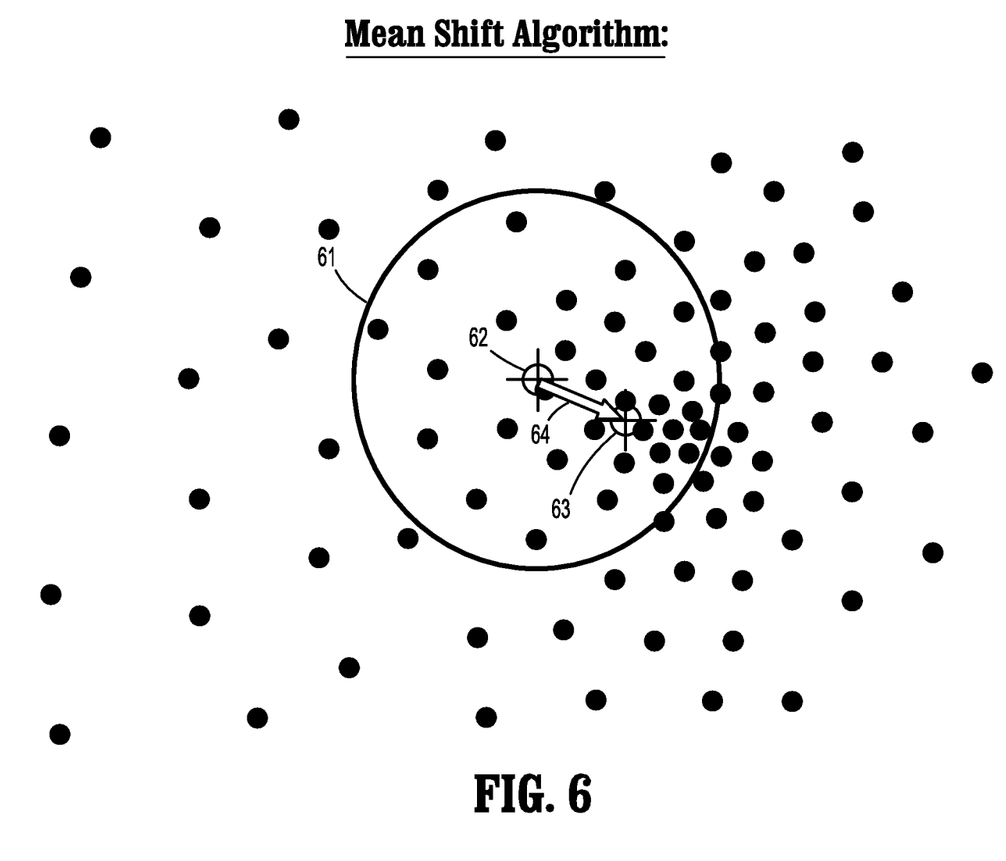
FIG. 6 illustrates a mean shift procedure, according to an embodiment of the invention.

It can be shown that, at location x, the mean shift vector computed with kernel g is proportional to a normalized density gradient estimate having kernel k. The mean shift vector thus always points toward the direction of maximum increase in the density. Since the mean shift vector is aligned with the local gradient estimate, it can define a path leading to a stationary point of the estimated density. A mean shift procedure, obtained by successive (1) computation of the mean shift vector $m_h(x_k)$, and (2) translation of the kernel (window) by the mean shift vector $x_{k+1}=x_k+m_h(x_k)$, is guaranteed to converge at a nearby point where the estimate has zero gradient. This is illustrated in FIG. 6, which shows a region of interest 61 defined by a kernel g of bandwidth h, a point 62 in the region, the stationary point 63, and a mean shift vector 64 pointing from the point 62 to the stationary point 63.

The mean shift as defined above only works for Euclidean spaces. However, the registration parameters $$T = \begin{bmatrix} R & t \\ 0 & 1 \end{bmatrix}$$

according to an embodiment of the invention are not in a vector space. But, using the metric of EQ. (3) instead of the Euclidean metric, a mean shift vector according to an embodiment of the invention can be calculated as follows:

$$\Delta_h(T) = \frac{-\sum_{j=0}^{m-1} \nabla d^2(T, T_i^j) C(T_i^j) g\left(\frac{d^2(T, T_i^j)}{h^2}\right)}{\sum_{j=0}^{m-1} C(T_i^j) g\left(\frac{d^2(T, T_i^j)}{h^2}\right)},$$ (4)

where g is the derivative of the kernel function k. The computed shift may be composed with the initial transformation $T_i$ using the following formulation:

$$T_{i+1} = \exp_{T_i}(\Delta_h(T_i))$$ (5)

until the $\|\Delta_h(T_i)\|_M < \epsilon$, for some small $\epsilon$, where the exp is the inverse of the log map, which is defined to transform SE(3) to its tangent space se(3).

Figure 2:
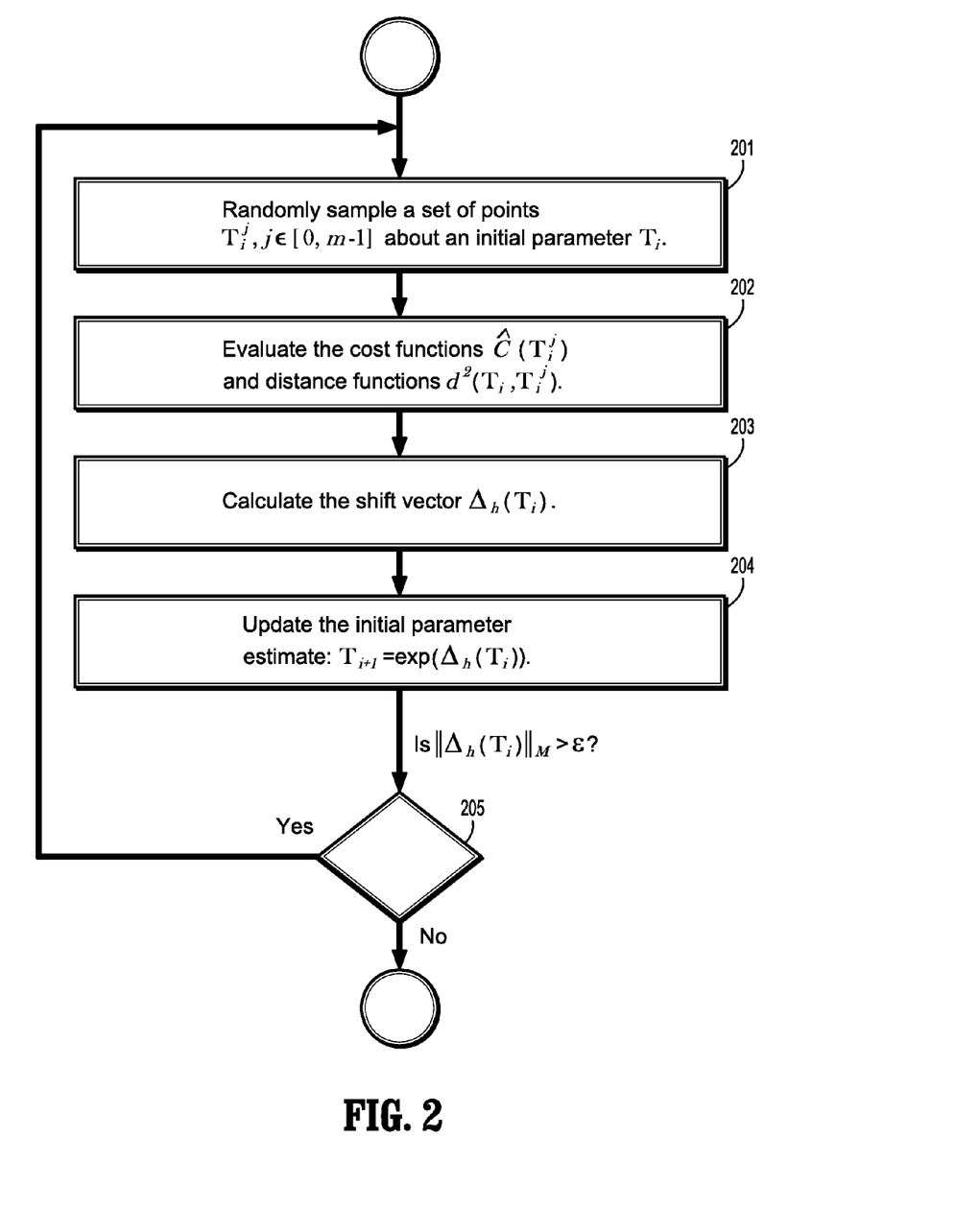
FIG. 2 is a flow chart of an exemplary iterative scheme for estimating a cost function, according to an embodiment of the invention.

EQS. (2) through (5) provide an iterative scheme to randomly explore parameter space of the cost function and always step toward the optimum based on the chosen scale (bandwidth) and accuracy (number of samples) to estimate a cost function width. A flow chart of an exemplary iterative scheme is presented in FIG. 2. Referring to the figure, an iterative scheme starts at step 201 by randomly sampling a set of points $T_i^j$, $j \in [0, m-1]$ about an initial parameter $T_i$. At step 202, the cost function $\hat{C}(T_i^j)$ is estimated, and the distance metric of EQ. (3) is evaluated for each randomly sampled point and the initial parameters $T_i$. At step 203, the shift vector $\Delta_h(T_i)$ is calculated using EQ. (4), and at step 204, the estimate of the initial parameter is updated according to EQ. (5): $T_{i+1}=\exp(\Delta_h(T_i))$. If, at step 205, $\|\Delta_h(T_i)\|_M > \epsilon$, the scheme returns to repeat steps 201-204. It is noteworthy to mention that the standard deviation of the random noise used to generate the samples for EQ. (2) should be consistent with the bandwidth of the kernel used. That means if one spreads the samples wide, one should be using a wider kernel to interpolate among them. In addition, evaluating the cost function can be computationally expensive, and choices regarding the number of samples to be used for each iteration need to be considered.

EXPERIMENTAL RESULTS

Figure 3:
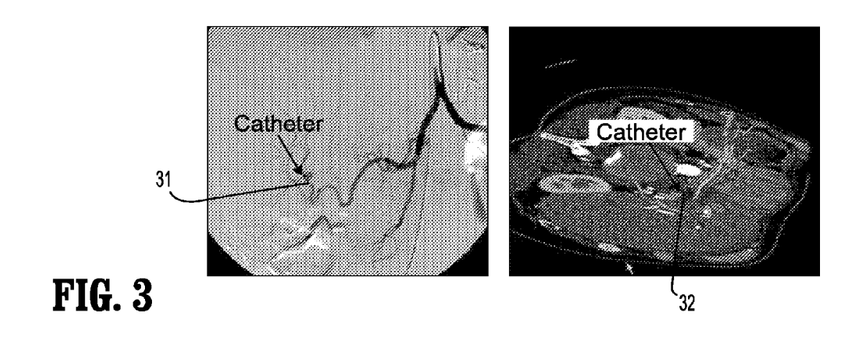
FIG. 3 shows a 2D DSA image and a 3D CTA image after registration with an overlaid catheter tip detected from the 2D DSA image, according to an embodiment of the invention.

Embodiments of the invention were tested in two clinical situations. In the first case, 2D-3D registration is needed as an enabling technology to merge 2D intra-operative Digital Subtracted Angiography (DSA) or fluoroscopic images with the high resolution 3D Computer Tomography Angiography (CTA) images. The registration serves to localize and visualize catheter tips and guide wires in the context of the 3D CTA. These interventions were performed for a neurological and an abdominal case. For example, FIG. 3 shows a 2D DSA image on the left with the catheter 31, and on the right, a 3D CTA image after registration with an overlaid catheter tip 32 detected from the 2D DSA image. In this case, a segmentation algorithm was used to extract the CTA vessel system. Furthermore, the 2D DSA was segmented to extract the vascular tree using the watershed algorithm. Anatomical landmarks, such as bifurcations, were used for computing ground truth and the FRE. In this case, the similarity metric in EQ. (1) is the sum of the CTA points projected onto the 2D distance map. This was an example in the category of feature-based registration.

Figure 4:
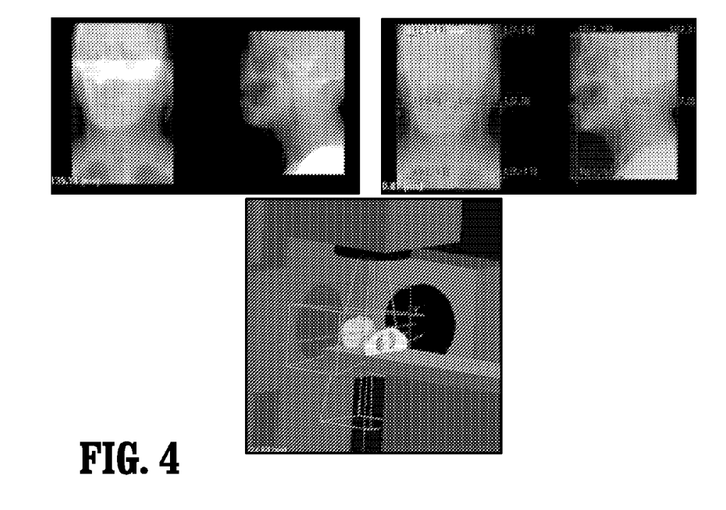
FIG. 4 depicts DRR images, portal images, and the patient CT image registered within the treatment machine coordinate system, according to an embodiment of the invention.

A second clinical scenario was patient positioning for radiotherapy. In this case, treatment 2D portal images need to be registered with the planning CT images in order to link the planning CT coordinate system with that from the treatment machine. The registration is then used to shift the patient to the planned position for an optimal dose delivery. In this case, an intensity-based approach was used, where the DRRs are generated for each cost function evaluation in EQ. (1). Phantom date sets with radio-opaque markers were used to compute the ground truth and establish the TRE. FIG. 4 depicts DRR images in the top left, portal images in the top right, and the patient CT image registered within the treatment machine coordinate system in the bottom.

Figure 5:
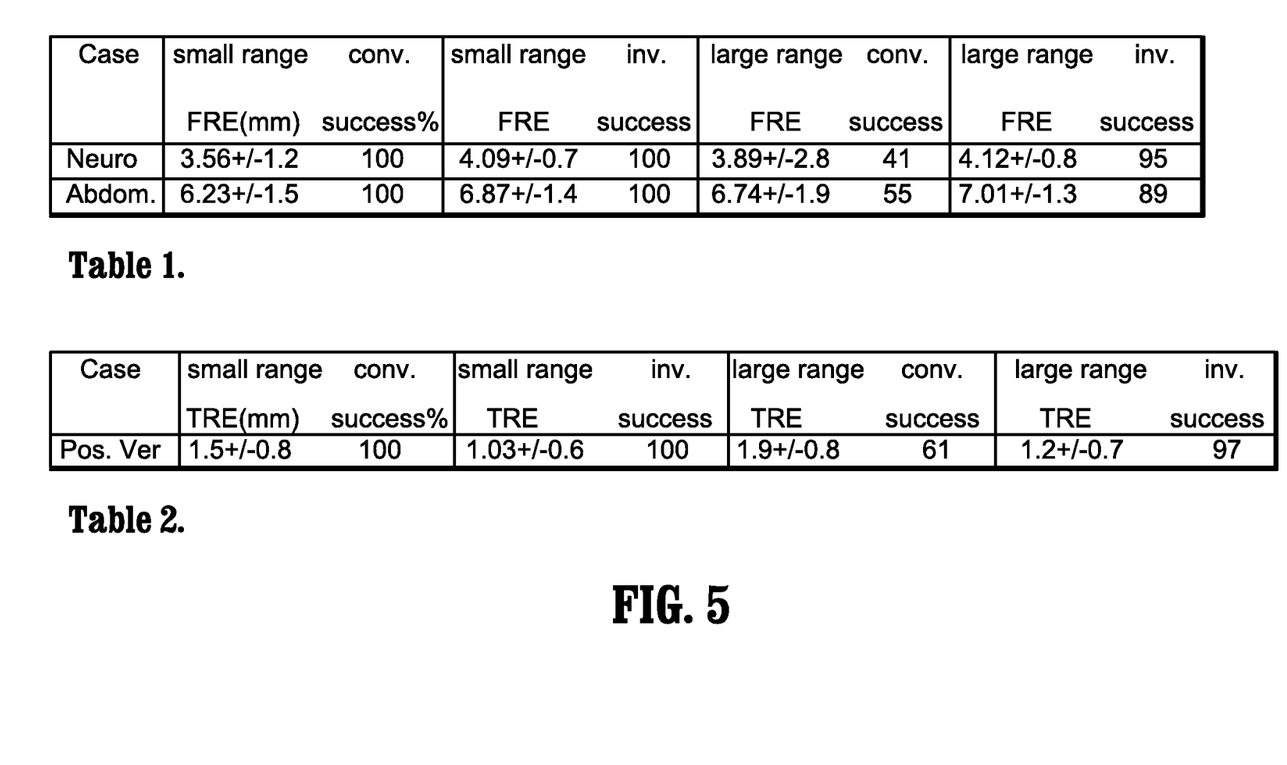
FIG. 5 presents Tables 1 and 2 of experimental results, according to an embodiment of the invention.

For both of the clinical scenarios, the initial registration was perturbed 100 times both by small amounts within the range of +/−10 mm and +/−10 degrees for translation and rotation parameters, respectively and by large amounts within the range of +/−20 mm and +/−20 degrees. The statistics of the error were computed based on the 100 runs and the results are summarized in Tables 1 and 2, shown in FIG. 5. Table 1 displays quantitative validation for the feature-based case, that of the neurological and abdominal interventions, respectively, and Table 2 displays quantitative validation for the intensity-based case of positioning verification of a patient for radiotherapy. Each table shows, from left to right, the error and success rate for small range perturbations for a conventional algorithm, small range perturbations for an algorithm according to an embodiment of the invention, large range perturbations for a conventional algorithm, and large range perturbations for an algorithm according to an embodiment of the invention. The FRE was used for the Table 1 results, and the TRE was used for the Table 2 results. Success was defined for the neurological and abdominal case, if the FRE was less than 10 mm. For the patient positioning case, success was defined as runs with a TRE less than 3 mm.

These experiments were performed using both a conventional best neighbor optimization method and a method according to an embodiment of the invention. The results demonstrate that a method according to an embodiment of the invention can provide a similar error range for cases where the initial registration parameters are close to optimal parameters. However, in cases where the initial registration parameters are within a wider range, a method according to an embodiment of the invention can provide improved robustness in terms of the success rate. A method according to an embodiment of the invention can provide an improved overall capture range and thus better overall robustness as compared to the conventional best neighbor optimization method. In terms of the speed, both approaches are similar as the same number of cost functional calls were used within the optimization steps of the algorithms. In this case, there were only 12 samples used to evaluate the cost function for EQ. (2). The results demonstrate that method according to an embodiment of the invention can deliver a more robust solution for 2D-3D image registration.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
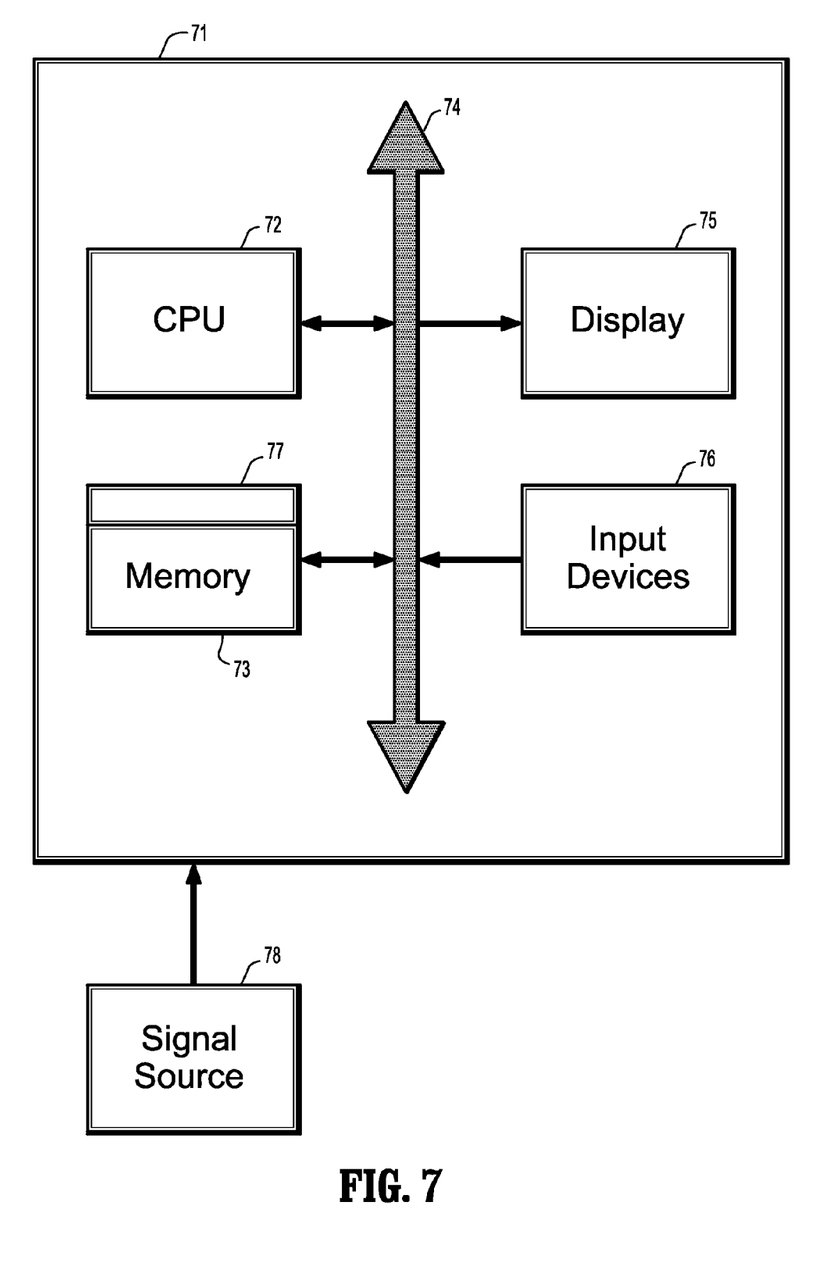
FIG. 7 is a block diagram of an exemplary computer system for implementing a method for registering 2D images with 3D images, according to an embodiment of the invention.

FIG. 7 is a block diagram of an exemplary computer system for implementing a method for registering 2D images with 3D images according to an embodiment of the invention. Referring now to FIG. 7, a computer system 71 for implementing the present invention can comprise, inter alia, a central processing unit (CPU) 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present invention can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A computer implemented method for registering 2-dimensional (2D) images with 3-dimensional (3D) images, the method performed by the computer comprising the steps of:
   receiving a 2D reference image and a 3D moving image;
   initializing a registration parameter matrix that rigidly transforms the domain of the moving image;
   randomly sampling a set of registration parameter matrices in a neighborhood of the initial registration parameters;
   estimating a cost function for each of the randomly sampled parameter matrices;
   calculating a distance from each randomly sampled parameter matrix to the initial registration parameter matrix, including calculating $d^2(T_i, T_i^j) = \|\log(T_i^{-1} T_i^j)\|_M^2$, wherein $T_i$ is the initial registration parameter matrix, $T_i^j$ is a randomly sampled parameter matrix, and $\|\cdot\|_M$ denotes a matrix norm;
   calculating a mean shift vector from said estimated cost functions and distance; and
   updating said initial registration parameter matrix from said mean shift vector.

2. The method of claim 1, further comprising repeating said steps of randomly sampling a set of parameters, estimating a cost function, calculating a distance, and calculating a mean shift vector until a magnitude of said mean shift vector is less than a predetermined constant.

3. The method of claim 1, wherein a cost function for a randomly sampled parameter matrix is determined by applying a randomly sampled parameter matrix to transform the domain of the moving image, and calculating one of a similarity metric or a dissimilarity metric on a 2D projection of the transformed moving image and the reference image.

4. The method of claim 1, wherein said registration parameter matrix is a 4×4 matrix representing a 3D affine transformation that includes rotation and translation.

5. The method of claim 1, wherein the mean shift vector is calculated from $$\Delta_h(T_i) = \frac{-\sum_{j=0}^{m-1} \nabla d^2(T_i, T_i^j) C(T_i^j) g\left(\frac{d^2(T_i, T_i^j)}{h^2}\right)}{\sum_{j=0}^{m-1} C(T_i^j) g\left(\frac{d^2(T_i, T_i^j)}{h^2}\right)},$$

wherein $T_i$ is the initial registration parameter matrix, $T_i^j$ is a randomly sampled parameter matrix, $C(T_i^j)$ is the cost function of $T_i^j$, $d^2(T_i, T_i^j)$ is the distance between $T_i$ and $T_i^j$, g is the derivative of a kernel function k of bandwidth h, and the sum is over all randomly sampled registration parameter matrices.

6. The method of claim 5, wherein said initial registration parameter matrix is updated from said mean shift vector according to $T_{i+1} = \exp_{T_i}(\Delta_h(T_i))$.

7. The method of claim 5, wherein said kernel function k is a bounded function that satisfies $\int k(\|x\|^2) dx = 1$, $\int \|x\| k(\|x\|^2) dx = 0$, $\lim_{\|x\| \to \infty} \|x\| k(\|x\|^2) = 0$, and $\int \|x\|^2 k(\|x\|^2) dx = c_k$, where $c_k$ is a constant and the integrals are over all space.

8. The method of claim 7, wherein the kernel function is a Gaussian.

9. The method of claim 5, wherein the bandwidth h of the kernel is determined from a standard deviation of a random distribution used to generate the randomly sampled set of registration parameter matrices.

10. The method of claim 2, further comprising changing a standard deviation of a random distribution used to generate the randomly sampled set of registration parameter matrices.

11. A computer implemented method for registering 2-dimensional (2D) images with 3-dimensional (3D) images, the method performed by the computer comprising the steps of:
receiving a 2D reference image and a 3D moving image;
initializing a registration parameter matrix that rigidly transforms the domain of the moving image;
randomly sampling a set of registration parameter matrices in a neighborhood of the initial registration parameters;
calculating a mean shift vector from $$\Delta_h(T_i) = \frac{-\sum_{j=0}^{m-1} \nabla d^2(T_i, T_i^j) C(T_i^j) g\left(\frac{d^2(T_i, T_i^j)}{h^2}\right)}{\sum_{j=0}^{m-1} C(T_i^j) g\left(\frac{d^2(T_i, T_i^j)}{h^2}\right)},$$

wherein $T_i$ is the initial registration parameter matrix, $T_i^j$ is a randomly sampled parameter matrix, $C(T_i^j)$ is a cost function of $T_i^j$, $d^2(T_i, T_i^j)$ is a distance between $T_i$ and $T_i^j$, g is the derivative of a Gaussian kernel function k of bandwidth h, and the sum is over all randomly sampled registration parameter matrices; and
calculating an updated registration parameter matrix $T_{i+1}$ from $T_{i+1} = \exp_{Ti}(\Delta_h(T_i))$.

12. The method of claim 11, wherein $d^2(T_i, T_i^j) = \|\log(T_i^{-1} T_i^j)\|_M^2$, wherein $\|\cdot\|_M$ denotes a matrix norm.

13. The method of claim 11, wherein said cost function $C(T_i^j)$ is determined by applying $T_i^j$ to transform the domain of the moving image, and calculating one of a similarity metric or a dissimilarity metric on a 2D projection of the transformed moving image and the reference image.

14. A program storage device readable by a computer, tangibly embodying a program of instructions executable by the computer to perform the method steps for registering 2-dimensional (2D) images with 3-dimensional (3D) images, the method comprising the steps of:
receiving a 2D reference image and a 3D moving image;
initializing a registration parameter matrix that rigidly transforms the domain of the moving image;
randomly sampling a set of registration parameter matrices in a neighborhood of the initial registration parameters;
estimating a cost function for each of the randomly sampled parameter matrices;
calculating a distance from each randomly sampled parameter matrix to the initial registration parameter matrix, including calculating $d^2(T_i, T_i^j) = \|\log(T_i^{-1} T_i^j)\|_M^2$, wherein $T_i$ is the initial registration parameter matrix, $T_i^j$ is a randomly sampled parameter matrix, and $\|\cdot\|_M$ denotes a matrix norm;
calculating a mean shift vector from said estimated cost functions and distance; and
updating said initial registration parameter matrix from said mean shift vector.

15. The computer readable program storage device of claim 14, the method further comprising repeating said steps of randomly sampling a set of parameters, estimating a cost function, calculating a distance, and calculating a mean shift vector until a magnitude of said mean shift vector is less than a predetermined constant.

16. The computer readable program storage device of claim 14, wherein a cost function for a randomly sampled parameter matrix is determined by applying a randomly sampled parameter matrix to transform the domain of the moving image, and calculating one of a similarity metric or a dissimilarity metric on a 2D projection of the transformed moving image and the reference image.

17. The computer readable program storage device of claim 14, wherein said registration parameter matrix is a 4×4 matrix representing a 3D affine transformation that includes rotation and translation.

18. The computer readable program storage device of claim 14, wherein the mean shift vector is calculated from $$\Delta_h(T_i) = \frac{-\sum_{j=0}^{m-1} \nabla d^2(T_i, T_i^j) C(T_i^j) g\left(\frac{d^2(T_i, T_i^j)}{h^2}\right)}{\sum_{j=0}^{m-1} C(T_i^j) g\left(\frac{d^2(T_i, T_i^j)}{h^2}\right)},$$

wherein $T_i$ is the initial registration parameter matrix, $T_i^j$ is a randomly sampled parameter matrix, $C(T_i^j)$ is the cost function of $T_i^j$, $d^2(T_i, T_i^j)$ is the distance between $T_i$ and $T_i^j$, g is the derivative of a kernel function k of bandwidth h, and the sum is over all randomly sampled registration parameter matrices.

19. The computer readable program storage device of claim 18, wherein said initial registration parameter matrix is updated from said mean shift vector according to $T_{i+1} = \exp_{Ti}(\Delta_h(T_i))$.

20. The computer readable program storage device of claim 18, wherein said kernel function k is a bounded function that satisfies $\int k(\|x\|^2)dx=1$, $\int \|x\| k(\|x\|^2)dx=0$, $\lim_{\|x\| \to \infty} \|x\| k(\|x\|^2)=0$, and $\int \|x\|^2 k(\|x\|^2) k(\|x\|^2)dx=c_k$, where $c_k$ is a constant and the integrals are over all space.

21. The computer readable program storage device of claim 20, wherein the kernel function is a Gaussian.

22. The computer readable program storage device of claim 18, wherein the bandwidth h of the kernel is determined from a standard deviation of a random distribution used to generate the randomly sampled set of registration parameter matrices.

23. The computer readable program storage device of claim 15, the method further comprising changing a standard deviation of a random distribution used to generate the randomly sampled set of registration parameter matrices.

* * * * *